United States Patent [19]

Pantry et al.

[11] Patent Number: 4,982,321
[45] Date of Patent: Jan. 1, 1991

[54] DUAL BUS SYSTEM

[75] Inventors: William J. Pantry, Portland, Oreg.; Burke B. Baumann, Glendale, Ariz.

[73] Assignee: Honeywell Inc., Minneapolis, Minn.

[21] Appl. No.: 113,418

[22] Filed: Oct. 23, 1987

[51] Int. Cl.⁵ ............................................. G06F 13/00
[52] U.S. Cl. ............................................................ 364/200
[58] Field of Search ... 364/200 MS File, 900 MS File

[56] References Cited

U.S. PATENT DOCUMENTS

| | | | |
|---|---|---|---|
| 4,007,448 | 2/1977 | Sergeant | 364/200 |
| 4,034,347 | 7/1977 | Probert, Jr. | 364/200 |
| 4,144,407 | 3/1979 | Zaffignani et al. | 370/42 |
| 4,149,239 | 4/1979 | Jenkins et al. | 364/200 |
| 4,403,282 | 9/1983 | Holberger et al. | 364/200 |
| 4,403,283 | 9/1983 | Myntti et al. | 364/200 |
| 4,403,286 | 9/1983 | Fry et al. | 364/200 |
| 4,412,283 | 10/1983 | Mor et al. | 364/200 |
| 4,439,829 | 3/1984 | Tsiang | 364/200 |
| 4,451,883 | 5/1984 | Stanley et al. | 364/200 |
| 4,458,313 | 7/1984 | Suzuki et al. | 364/200 |
| 4,459,665 | 7/1984 | Miu et al. | 364/200 |

OTHER PUBLICATIONS

Alexandridis, Microprocessor System Design, 1984, p. 28,218.

Primary Examiner—David L. Clark
Attorney, Agent, or Firm—A. A. Sapelli; D. J. Lenkszus; A. Medved

[57] ABSTRACT

The data processing system, has at least one memory unit operatively connected to a memory bus, and further has an input/output (I/O) bus controller for interfacing at least one peripheral device to the data processing system. The data processing system comprises a first bus which provides a first transmission medium between the peripheral device and the memory bus. A second bus, provides a second transmission medium between a CPU and the memory bus. A logic element, interposed between the first and second bus, and the memory bus, interfaces the first and second bus to the memory bus in response to request signals from the first and second bus.

6 Claims, 3 Drawing Sheets

DUAL BUS SYSTEM

This is a continuation of co-pending application Ser. No. 684,325, filed on Dec. 20, 1984, now abandoned.

RELATED APPLICATION

The present patent application is related to U.S. patent application, Ser. No. 084,312, entitled "Arbitration Circuit", by B. B. Baumann and W. J. Pantry, filed on even date herewith, now U.S. Pat. No. 4,612,542 which issued on Sept. 16, 1986, assigned to Honeywell Inc., the assignee of the present application and is incorporated by reference herein.

BACKGROUND OF THE INVENTION

This invention relates to a computer system, and more particularly, to a dual bus system in a computer system for providing separate paths, the first path for instruction fetch and operand read/write and a second path for the peripheral I/O, thereby achieving a degree of simultaneity increasing memory bandwidth and obtaining higher system performance.

In earlier systems, a single bus for all instruction fetches, operand read/writes, and peripheral I/O was utilized. The single bus allowed for no degree of simultaneity and therefore only a single memory cycle at a time could be serviced, i.e. instruction fetches, operand read/writes, and peripheral I/O. The simultaneity is achieved in the dual bus system of the present application by providing separate paths for instruction fetch and operand read/write from the path utilized for the peripheral I/O. Therefore, the peripheral I/O can be made to overlap/interleave with the instruction fetch, and to a lesser extent the operand read/write can be made to partially overlap with the peripheral I/O.

SUMMARY OF THE INVENTION

Therefore, there is supplied by the present invention, a dual bus data processing system. The data processing system, has at least one memory unit operatively connected to a memory bus, and further has an input/output (I/O) bus controller for interfacing at least one peripheral device to the data processing system. The data processing system comprises a first bus which is operatively connected to the peripheral device, for providing a first transmission medium between the peripheral device and the memory bus. A CPU is also included for processing information A second bus, operatively connected to the CPU provides a second transmission medium between the CPU and the memory bus. A logic element, interposed between the first bus and the second bus, and the memory bus, interfaces the first bus and the second bus to the memory bus in response to request signals from the first and second bus.

Accordingly, it is an object of the present invention to provide a dual bus system for essentially simultaneous instruction fetch and peripheral I/O operations.

This and other objects of the present invention will become more apparent when taken in conjunction with the following description and attached drawings, wherein like characters indicate like parts, and which drawings form a part of the present application.

DETAILED DESCRIPTION

Figure 1:
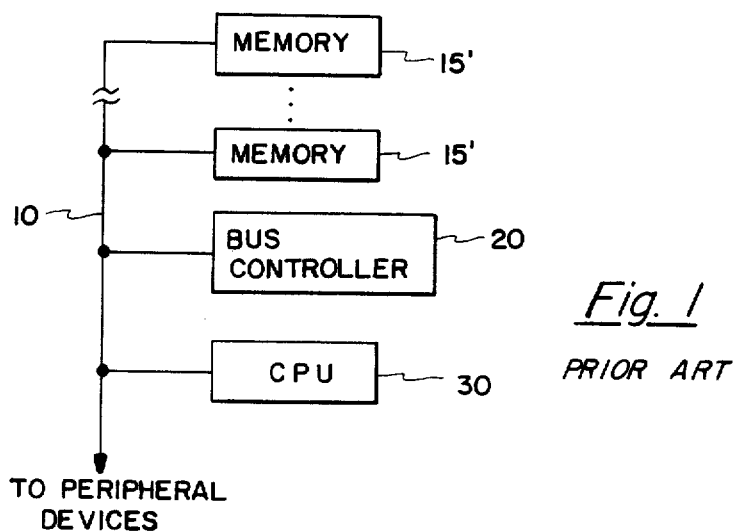
FIG. 1 shows a block diagram of a single bus system of the prior art.

Referring to FIG. 1, there is shown a block diagram of a data processing system showing a single bus system of the prior art. A single bus 10, has attached thereto, a memory 15, shown here as a plurality of memory units 15', a bus controller 20, and a CPU 30. Also attached to the bus 10 is a variety of peripheral devices (not shown). Communication between the subsystems attached to the bus 10 and the peripheral devices, occurs via the bus 10. The single bus 10 allows for no degree of simultaneity and therefore only a single memory cycle at a time can be serviced, i.e. instruction fetches, operand read/writes, and peripheral input/output (I/O).

Figure 2:
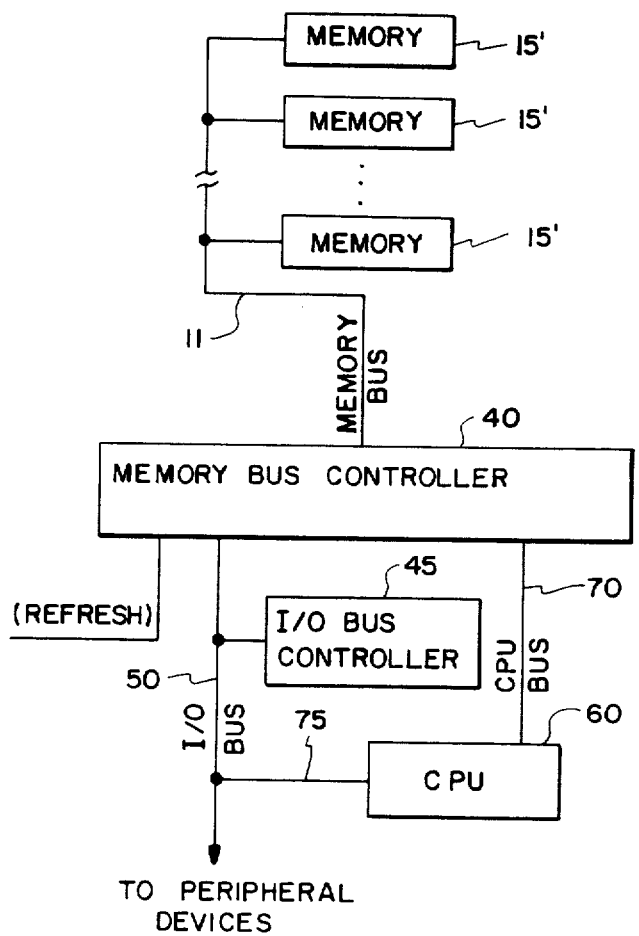
FIG. 2 shows a block diagram of a data processing system of the preferred embodiment of the present invention.

Referring to FIG. 2, there is shown a block diagram of a data processing system of the preferred embodiment of the present invention. A memory bus controller 40 is operatively connected to a memory bus 11, the memory bus 11 having attached thereto a memory 15 which includes a plurality of memory units 15'. An I/O bus controller 45 is operatively connected to a plurality of peripheral devices (not shown), to an I/O bus 50, the I/O bus 50 being operatively connected to the memory bus controller 40. A CPU 60 is operatively connected to the memory bus controller 40 via a second bus, the CPU bus 70. The CPU 60 is also operatively connected to the I/O bus 50 via line 75 for communicating control information directly to the peripheral devices. The memory bus controller 40 will be described in detail hereinunder. Although only two buses are shown herein, i.e. I/O bus 50 and CPU bus 70, there can be additional bus inputs to the memory bus controller 40. For example, for memory 15 comprising dynamic RAMS requiring a refresh cycle, a REFRESH input can be included and can be given an appropriate priority by the memory bus controller 40, the operation of the memory bus controller 40 to be described further hereinunder.

Figure 3:
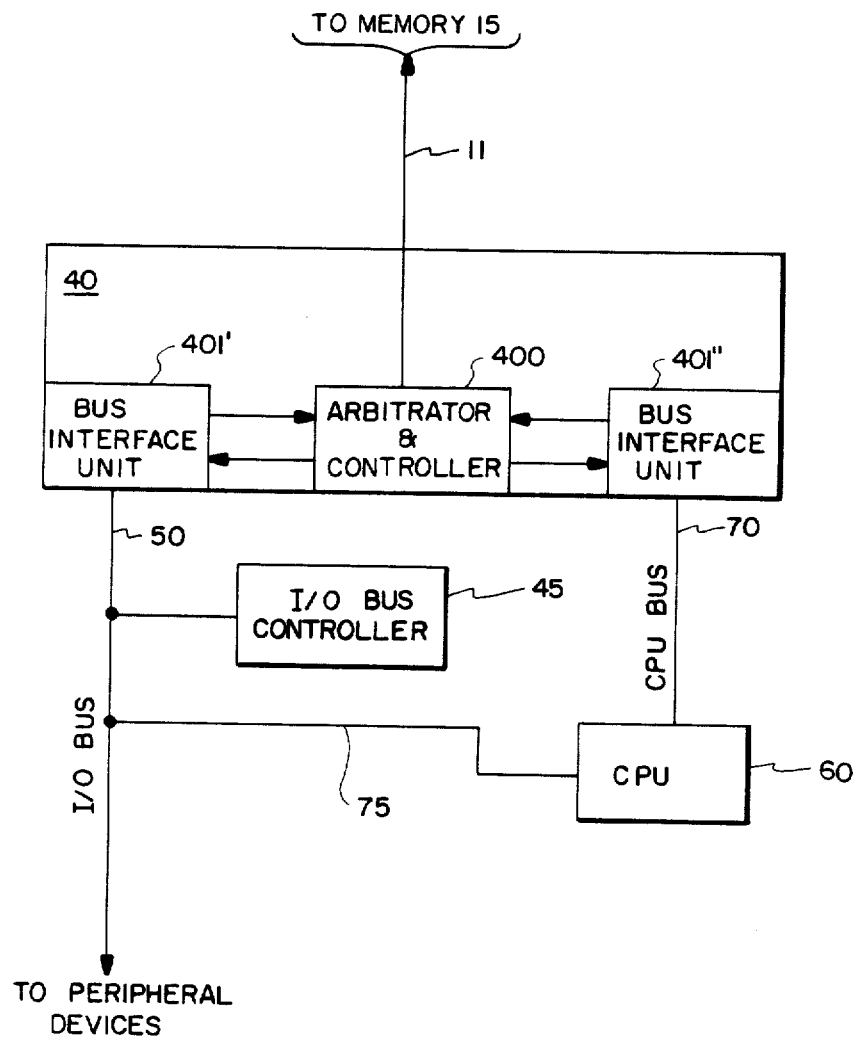
FIG. 3 shows a functional block diagram of a memory bus controller of the data processing system of FIG. 2.

Referring to FIG. 3, there is shown a functional block diagram of the memory bus controller 40. The memory bus controller 40 provides the interface to the memory 15 via the memory bus 11 for the I/O bus 50 and the CPU bus 70. The memory bus controller 40 comprises an arbitrator and controller unit 400, and a plurality of bus interface units 401 for interfacing with each bus, i.e. a bus interface unit 401' for the I/O bus 50, and a bus interface unit 401" for the CPU bus 70. The memory bus controller 40 is operatively connected to the memory 15 via memory bus 11, and the logic of the bus interface unit 401 and the arbitrator and controller unit 400 provides the interface for the I/O bus 50 and the CPU bus 70.

Figure 4:
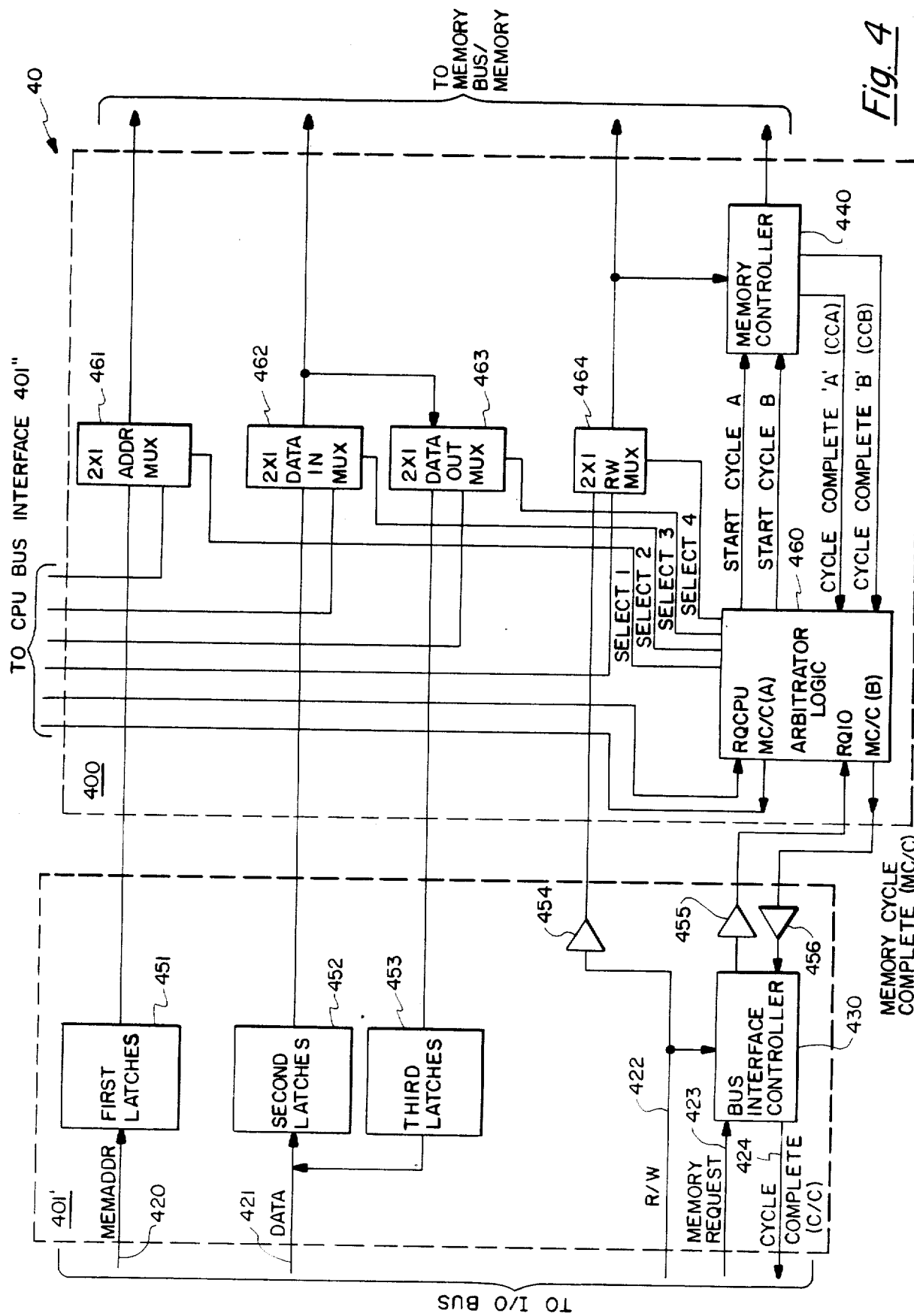
FIG. 4 shows a partial logic block diagram of the memory bus controller of FIG. 3.

The operation of the memory bus controller 40 will now be described. Referring to FIG. 4, there is shown a partial logic block diagram of the memory bus controller 40 (only a single bus interface unit 401 is shown, namely, the bus interface unit 401' for the I/O bus 50). The I/O bus 50, as is true of buses in general, contains address lines, data lines, and control lines. The memory address desired to be communicated with is contained on address lines, MEMADDR, 420, and the data lines, DATA, 421 contains the data associated with the address contained on address lines 420. The data will be present on the data lines 421 after it is read from memory 15, or if data is to be written into memory 15, the data will be on the data lines 421 and will be written into the memory 15 at the address specified on address lines 420. The control lines of I/O bus 50 includes a read/write line, R/W, 422 which specifies if the memory 15 is to be read or written. A MEMORY REQUEST line 423, which is a request from the I/O bus controller 45 is connected to I/O bus 50 and signifies that there is a memory request on the bus. A cycle complete line, C/C, 424, is an acknowledge signal from a bus interface controller 430 associated with the I/O bus 50 signifying to the I/O bus controller 45 that the bus cycle is completed. The bus interface controller 430 is part of the bus interface unit 401'. The bus interface unit 401' also contains the line drivers/receivers 454, 455, 456, to interface the control signals of the I/O bus 50 with the arbitrator and controller 400.

The arbitrator and controller logic 400 interfaces with the memory bus 11, and includes a memory controller 440, and also interfaces with the CPU bus interface unit 401". As will subsequently become apparent to those skilled in the art, the bus protocols may be different, the bus timing may be different, and the bus interfaces can be different. However, the interface to the arbitrator and controller unit 400 is the same.

Bus interface unit 401 comprises a block of first latches 451 for holding the memory address contained on address lines 420. A block of second latches 452, and a block of third latches 453 is utilized for data. Data to be written into memory 15 contained on data lines 421 is temporarily stored in second latches 452. Data to be read from memory 15 is transmitted from memory 15 and temporarily stored in third latches 453 for subsequent transmission to the I/O bus 50 via data lines 421. In the preferred embodiment of the present invention a data word is 24 bits wide, hence, the latches 452, 453, are 24-bits wide, sufficient to store a data word.

The arbitrator and controller unit 400 includes a 2X1 ADDR MUX 461 operatively connected to the first latches 451 of the bus interface unit 401', and to the first latches, or equivalent (not shown), of the bus interface unit 401". The ADDR MUX 461 selects the address data from the bus interface unit 401 granted access to the memory bus 11, the selection being controlled by a select signal, SELECT1, from an arbitrator logic unit 460 which is also included as part of the arbitrator and controller unit 400. A 2X1 DATAIN MUX 462 is operatively connected to the second latches 452 of bus interface unit 401', and to second latches, or equivalent (not shown), of the bus interface unit 401". The DATAIN MUX 462 selects the data from the bus interface unit 401 granted access to the memory bus 11, the selection being controlled by the select signal, SELECT2, from the arbitrator logic unit 460. A 2X1 DATAOUT MUX 463 is operatively connected to the third latches 453 of bus interface unit 401', and to third latches, or equivalent (not shown), of the bus interface unit 401". The DATAOUT MUX 463 effectively selects the bus interface unit 401 which is to receive data read from the memory 15, the selection being controlled by the select signal, SELECT3, from the arbitrator logic unit 460. A 2X1 R/W MUX 464 receives the read/write (R/W) control signal from the bus interface unit 401' and from a bus interface unit 401" (not shown). The R/W MUX 464 selects the read/write control signal to be transmitted to the memory bus 11 under control of the arbitrator logic unit 460 via the select signal, SELECT4. The arbitrator logic unit 460 receives a request signal, RQIO from the I/O bus 50 via the bus interface controller 430, and also receives a request signal, RQCPU, from the CPU bus 70 via a bus interface controller associated with the CPU bus 70 (not shown). The arbitrator logic unit 460 grants access to the memory 15 to a single requestor at a time in response to the request signals. If the request signals arrive simultaneously, or nearly simultaneous, the arbitrator logic unit 460 grants access to the memory bus (i.e. grants the request) to one of the requestors on a priority basis. The arbitrator logic unit 460 interfaces to the memory controller 440 and indicates to the memory controller 440 that a request has been granted and a memory cycle is about to start, via the START CYCLE A signal or START CYCLE B signal. When the memory 15 has completed the actual read/write, the memory controller 440 indicates to the arbitrator logic unit 460 that the actual memory cycle is completed via the control signals CYCLE COMPLETE A (CCA) and CYCLE COMPLETE B (CCB). The arbitrator logic, in turn, transmits a control signal, MEMORY CYCLE COMPLETE (MCC) to the interface bus controller of the selected bus indicating completion of post memory cycle activity, such as parity checking, error detection and correction, etc. A more detailed description and operation of the arbitrator logic unit 460 can be obtained from the related patent application, Ser. No. 684,312, entitled "Arbitration Circuit", filed on even date herewith, now U.S. Pat. No. 4,612,542 which issued on Sept. 16, 1986, and assigned to the same assignee of the present application, and is incorporated by reference herein.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. A data processing system, having at least one peripheral device interfaced to said data processing system, said data processing system comprising:
    (a) first bus means, wherein at least one of said peripheral devices is operatively connected to said first bus means, for providing a transmission path between at least one of said peripheral devices and said data processing system;
    (b) second bus means for providing a transmission path within said data processing system;
    (c) memory means, wherein said memory means includes;
        (i) storage means, for storing information;
        (ii) memory bus, said storage means being operatively connected to said memory bus; and
        (iii) memory controller means, operatively connected to said first bus means and said second bus means, for selectively interfacing said first bus means and said second bus means to said memory bus in response to request signals from said first bus means and said second bus means; and
    (d) CPU means for processing information, said CPU means operatively connected to said second bus means and further operatively connected to said first bus means, thereby providing said CPU means access to said memory means via said first bus means and said second bus means, and further providing said CPU means with direct access to at least one of said peripheral devices.

2. A data processing system according to claim 1 wherein said memory bus controller means comprises:
   a plurality of bus interface means, wherein a first bus interface means is operatively connected to the first bus means and a second bus interface means is operatively connected to the second bus means, for providing a common output; and
   arbitrator means, operatively connected to the common outputs of each of said bus interface means and responsive to the receipt of request control signals from the second bus means and the first bus means, for selectively connecting the first bus means or the second bus means to the memory bus.

3. A data processing system, according to claim 2, wherein said memory bus controller means further comprising:
   multiplexer means, responsive to control signals transmitted to the memory bus controller means over the control lines of the first bus means and the second bus means, for selectively connecting address, data and control signals from the first bus means or the second bus means to the memory bus, or the data signals from the memory bus to the data lines of the first bus means or the second bus means.

4. A data processing system, comprising:
   (a) a memory bus;
   (b) a memory unit, operatively connected to said memory bus;
   (c) an I/O bus;
   at least one peripheral, operatively connected to said I/O bus;
   (e) a CPU bus, wherein said CPU bus, said memory bus and said I/O bus each includes address lines for transmitting address signals, data lines for transmitting data signals, and control lines for transmitting control signals;
   (f) a CPU, operatively connected to said CPU bus, and further operatively connected to said I/O bus; and
   (g) memory bus controller means, operatively connected to said memory bus, said I/O bus, and said CPU bus, for selectively interfacing the I/O bus and the CPU bus to the memory bus responsive to control signals transmitted to the memory bus controller means over the control lines of the I/O bus and the CPU bus.

5. A data processing system according to claim 4 wherein said memory bus controller means comprises:
   a plurality of bus interface means, wherein a first bus interface means is operatively connected to the I/O bus and a second bus interface means is operatively connected to the CPU bus, for providing a common output; and
   arbitrator means, operatively connected to the common outputs of each said bus interface means and responsive to the receipt of request control signals from the CPU bus and I/O bus, for selectively connecting the I/O bus or the CPU bus to the memory bus.

6. A data processing system, according to claim 5, wherein said memory bus controller means further comprises:
   multiplexer means, responsive to control signals transmitted to the memory bus controller means over the control lines of the I/O bus and CPU bus, for selectively connecting address, data and control signals from the I/O bus or the CPU bus to the memory bus, or the data signals from the memory bus to the data lines of the I/O bus or the CPU bus.

* * * * *